(12) United States Patent
Chao et al.

(10) Patent No.: US 12,712,579 B2
(45) Date of Patent: Aug. 18, 2026

(54) RADIO FREQUENCY AMPLIFICATION CIRCUIT CAPABLE OF OPERATING IN MULTIPLE GAIN MODES

(71) Applicant: RichWave Technology Corp., Taipei City (TW)

(72) Inventors: Yu-Hsuan Chao, Taipei City (TW); Chih-Sheng Chen, Taipei City (TW)

(73) Assignee: RichWave Technology Corp., Taipei City (TW)

( * ) Notice: Subject to any disclaimer, the term of this patent is extended or adjusted under 35 U.S.C. 154(b) by 373 days.

(21) Appl. No.: 18/540,894

(22) Filed: Dec. 15, 2023

(65) Prior Publication Data

US 2025/0158647 A1 May 15, 2025

(30) Foreign Application Priority Data

Nov. 13, 2023 (TW) ................................ 112143621

(51) Int. Cl.
*H04B 1/04* (2006.01)
*H04B 1/00* (2006.01)

(52) U.S. Cl.
CPC ......... *H04B 1/0483* (2013.01); *H04B 1/0078* (2013.01)

(58) Field of Classification Search
CPC ....... H04B 1/0483; H04B 1/0078; H03F 3/19; H03F 1/02
See application file for complete search history.

(56) References Cited

U.S. PATENT DOCUMENTS

| | | | | |
|---|---|---|---|---|
| 8,089,312 | B2 * | 1/2012 | Okayama | H04B 1/18 330/51 |
| 10,536,121 | B2 | 1/2020 | Lee | |
| 2016/0056774 | A1 * | 2/2016 | Ilkov | H03F 3/19 330/251 |
| 2018/0248526 | A1 * | 8/2018 | Lee | H03F 3/21 |
| 2019/0363690 | A1 | 11/2019 | Golat | |
| 2020/0259471 | A1 * | 8/2020 | Lee | H03F 3/21 |
| 2024/0213932 | A1 * | 6/2024 | Jiang | H03F 3/193 |

OTHER PUBLICATIONS

Office action mailed on Aug. 8, 2024 for the Taiwan application No. 112143621, filing date Nov. 13, 2023, pp. 1-7.

* cited by examiner

*Primary Examiner* — Fayyaz Alam
(74) *Attorney, Agent, or Firm* — Winston Hsu

(57) ABSTRACT

A radio frequency (RF) amplification circuit has an input terminal for receiving an RF input signal, an output terminal for providing an RF output signal, an amplification path, and a bypass path. The amplification path is coupled between the input terminal and output terminal and includes an amplifier. The bypass path and the amplification path are coupled in parallel between the input terminal and the output terminal, and the bypass path includes a bypass switch, a first node, a second node, a wiring segment, and a variable capacitive structure. The first node is located between the input terminal and the bypass switch. The second node is located between the first node and the bypass switch. The wiring segment is coupled between the first node and second node. The variable capacitive structure is coupled between the first and second nodes and includes a capacitive element and a switching element.

19 Claims, 5 Drawing Sheets

RADIO FREQUENCY AMPLIFICATION CIRCUIT CAPABLE OF OPERATING IN MULTIPLE GAIN MODES

TECHNICAL FIELD

The present invention relates to a radio frequency (RF) amplification circuit, and in particular to an RF amplification circuit capable of operating in multiple gain modes.

BACKGROUND

Wireless communication devices typically include a front-end module for at least amplifying received radio frequency (RF) signals. The front-end module may operate in various gain modes to provide different levels of signal amplification. This is particularly important as it allows the wireless communication device to achieve optimal performance based on the intensity and/or quality of the received signal. In wireless communication technology, multiple gain modes may involve multiple signal transmission paths. For example, due to device volume and/or layout constraints, multiple signal transmission paths may not be conducive to performance improvement.

SUMMARY

An embodiment of the present invention provides a radio frequency (RF) amplification circuit. The RF amplification circuit comprises an input terminal configured to receive an RF input signal, an output terminal configured to provide an RF output signal, an amplification path, and a bypass path. The amplification path is coupled between the input terminal and the output terminal and comprises an amplifier. The bypass path is coupled in parallel with the amplification path between the input terminal and the output terminal, and comprises a first bypass switch, a first node, a second node, a first wiring segment, and a first variable capacitive structure. The first node is located between the input terminal and the first bypass switch. The second node is located between the first node and the first bypass switch. The first wiring segment and the first variable capacitive structure may be disposed between the first node and the second node and the first variable capacitive structure may comprise a first capacitive element and a first switching element.

Another embodiment of the present invention provides another RF amplification circuit comprising an input terminal configured to receive an RF input signal, an output terminal configured to provide an RF output signal, an amplification path, and a bypass path. The amplification path is coupled between the input terminal and the output terminal and comprises an amplifier. The bypass path is coupled in parallel with the amplification path between the input terminal and the output terminal, and comprises a bypass switch, a first node, a second node, a wiring segment, and a variable capacitive structure. Additionally or alternatively, the first node may be located between the output terminal and the bypass switch, and the second node may be located between the first node and the bypass switch. The wiring segment and the variable capacitive structure are disposed between the first node and the second node, and the variable capacitive structure may comprise a capacitive element and a switching element.

DETAILED DESCRIPTION

Figure 1:
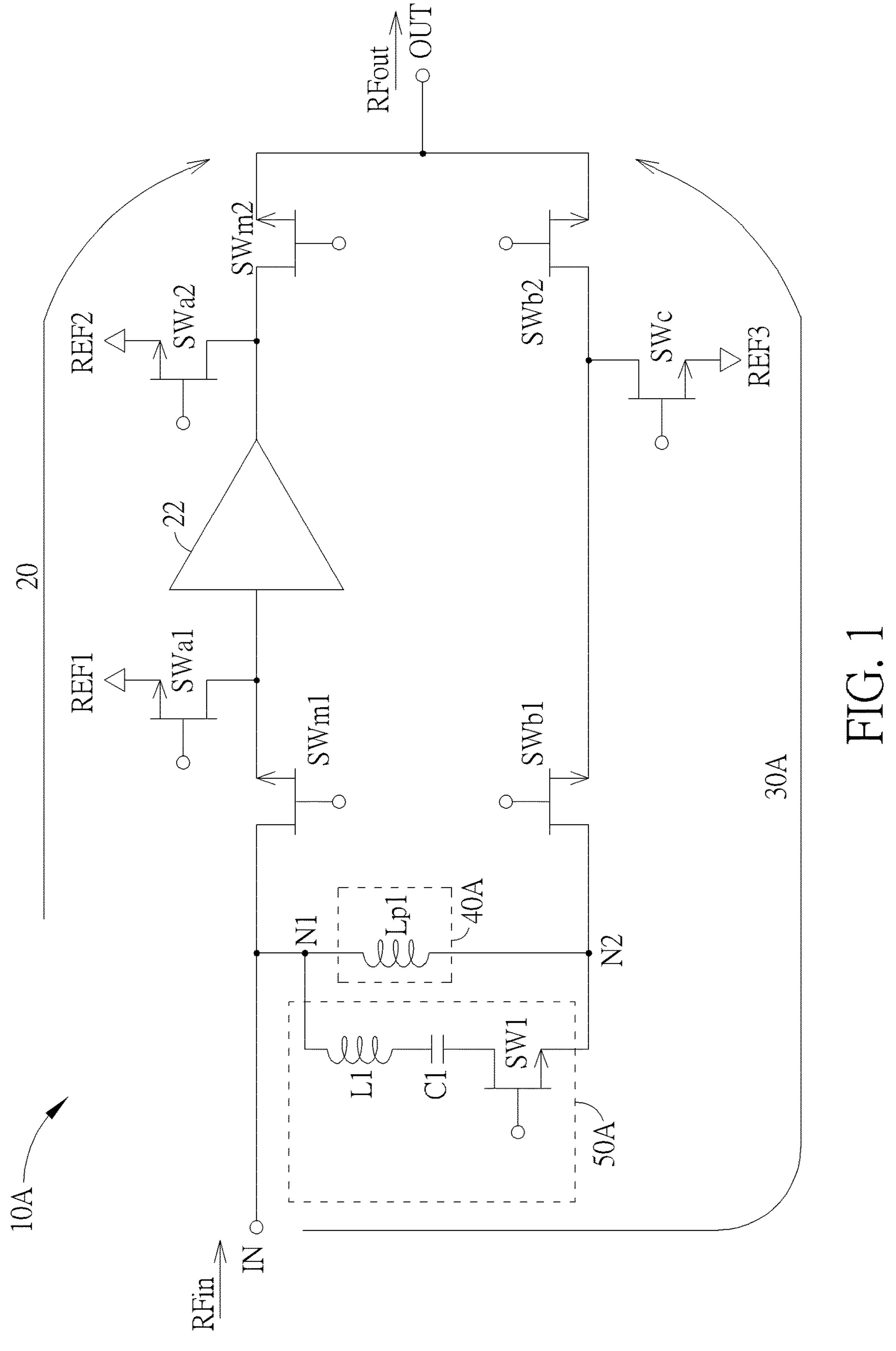
FIG. 1 is a schematic circuit diagram of a radio frequency amplification circuit according to an embodiment of the present invention.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a schematic circuit diagram of a radio frequency (RF) amplification circuit 10A according to an embodiment of the present invention. As shown in FIG. 1, the RF amplification circuit 10A may comprise an input terminal IN, an output terminal OUT, an amplification path 20, and a bypass path 30A. The input terminal IN may be configured to receive an RF input signal RFin, and the output terminal OUT may be configured to provide at least one RF output signal RFout. Furthermore, the output terminal OUT may be coupled to an antenna or another RF circuit.

In some embodiments, the amplification path 20 may be coupled between the input terminal IN and the output terminal OUT, and may comprise an amplification switch SWm1 and an amplifier 22. The amplification switch SWm1 may be coupled between the input terminal IN and the amplifier 22, with its first end coupled to the input terminal IN, its second end coupled to the amplifier 22, and its control end configured to receive a control signal. The amplification switch SWm1 may control the electrical connection between the input terminal IN and the input end of the amplifier 22 based on the received control signal. A first end (e.g., an input end) of the amplifier 22 may be coupled to the amplification switch SWm1, and a second end (e.g., an output end) of the amplifier 22 may be coupled to the output terminal OUT. In the embodiment, the RF input signal RFin received by the input terminal IN may be amplified via the amplification path 20, thereby providing a first RF output signal at the output terminal OUT. In this embodiment, the amplifier 22 is not limited as a single-stage amplifier. The amplifier 22 may also be a multi-stage amplifier. For example, the multi-stage amplifier may include but not limited to a pre-amplifier, an inter-stage amplifier, a buffer amplifier, or a power amplifier, etc.

The bypass path 30A may be coupled in parallel with the amplification path 20 between the input terminal IN and the output terminal OUT. The RF input signal RFin received by the input terminal IN may be transmitted via the bypass path 30A, thereby providing a second RF output signal at the output terminal OUT. In the RF amplification circuit 10A, the RF input signal RFin may be processed or transmitted via the amplification path 20 or the bypass path 30A, thereby outputting the first RF output signal or the second RF output signal at the output terminal OUT. The first RF output signal and the second output signal may have different power and/or frequencies. In some embodiments, for example, if the power of the RF input signal RFin is low and amplification is desired, the RF input signal RFin may be amplified via the amplification path 20, so as to ensure the communication quality. If the power of the RF input signal RFin is high and the amplification may not be desired, the RF input signal RFin may be transmitted via the bypass path 30A, so as to achieve reduced energy consumption. In other words, for the RF input signal RFin, the gain provided by the amplification path 20 may be greater than the gain provided by the bypass path 30A, thus allowing the RF amplification circuit 10A to operate in multiple gain modes as needed.

In some embodiments, the bypass path 30A may comprise a bypass switch SWb1, a node N1, and a node N2. The node N1 may be located between the input terminal IN and the bypass switch SWb1, and the node N2 may be located between node N1 and the bypass switch SWb1. In other words, the node N1 may be located adjacent to the input terminal IN, and the node N2 may be located adjacent to the bypass switch SWb1. The bypass path 30A may further comprise a wiring segment 40A and a variable capacitive structure 50A disposed between the nodes N1 and N2. For example, the wiring segment 40A may be inductive, such as including at least one set of windings. Alternatively, the wiring segment 40A may be a metal wire connecting the nodes N1 and N2 without winding. In this case, the wiring segment 40A may have a parasitic inductance Lp1.

In some embodiments, the amplification path 20 and the bypass path 30A may be substantially disposed on the same chip. For example, the amplifier 22 of the amplification path 20 may be disposed on a first chip, and the bypass switch SWb1 of the bypass path 30A may also be disposed on the first chip. The node N1 adjacent to the input terminal IN, and the node N2 adjacent to the bypass switch SWb1 may both be located on the first chip. In this case, the wiring segment 40A, for example, may be located on the first chip and connected between the nodes N1 and N2. However, the invention is not limited thereto. In other embodiments, the wiring segment 40A may be located on a carrier board other than the first chip, such as on a printed circuit board (PCB), and still may be connected between the nodes N1 and N2.

In other embodiments, the amplification path 20 and the bypass path 30A may be substantially disposed on different chips. For example, the amplifier 22 of the amplification path 20 may be disposed on a first chip, and the bypass switch SWb1 of the bypass path 30A may be disposed on a second chip. The node N1 adjacent to the input terminal IN may be located on the first chip, and the node N2 adjacent to the bypass switch SWb1 may be located on the second chip. In this case, the wiring segment 40A, for example, may be a metal wire connected between the first chip and the second chip, and the wiring segment 40A may be located on a printed circuit board other than the first chip or the second chip.

In some embodiments, the variable capacitive structure 50A may be coupled in parallel with the wiring segment 40A between the nodes N1 and N2. The variable capacitive structure 50A may comprise a capacitive element C1 and a switching element SW1. As shown in FIG. 1, the variable capacitive structure 50A may additionally comprise an inductive element L1. In the variable capacitive structure 50A, a first end of the inductive element L1 may be coupled to the node N1, and a second end of the inductive element L1 may be coupled to the capacitive element C1. A first end of the capacitive element C1 may be coupled to the inductive element L1, and a second end of the capacitive element C1 may be coupled to the switching element SW1. A first end of the switching element SW1 may be coupled to the capacitive element C1, a second end of the switching element SW1 may be coupled to the node N2, and a control end of the switching element SW1 may be configured to receive a control signal. The switching element SW1 may be turned on or off according to the received control signal. In some embodiments, the inductive element L1 may be a physical inductor, for example, including at least one set of windings. Alternatively, the inductive element L1 may be a metal wiring segment connecting the node N1 and the capacitive element C1, and does not include any windings. In this case, the inductive element L1 may have a parasitic inductance. However, the invention is not limited thereto. In other embodiments, the inductive element L1 may be omitted. In further embodiments, the positions of the capacitive element C1 and the switching element SW1 may be interchanged.

In some embodiments, the distance between nodes N1 and N2 may be significantly great, in other words, the wiring segment 40A may be significantly long. In this case, the capacitive element C1 and the switch element SW1, relative to the inductive element L1, may be preferably located more adjacent to the bypass switch SWb1.

In the above embodiments, when the RF amplification circuit 10A operates in a first gain mode (e.g., an amplification mode), the amplification path 20 may be substantially turned on (e.g., the amplification switch SWm1 is turned on), and the bypass path 30A may be substantially turned off (e.g., the bypass switch SWb1 is turned off), so that the RF input signal RFin may be substantially amplified via the amplification path 20. When the RF amplification circuit 10A operates in the second gain mode (e.g., a bypass mode), the amplification path 20 may be substantially turned off (e.g., the amplification switch SWm1 is turned off), and the bypass path 30A may be substantially turned on (e.g., the bypass switch SWb1 is turned on), so that the RF input signal RFin may be substantially transmitted via the bypass path 30A without amplification.

Taking the first gain mode as an example, the RF input signal RFin is substantially transmitted via the amplification path 20, and the bypass switch SWb1 in the bypass path 30A may be turned off. In this case, the bypass switch SWb1 in the off state may be equivalently considered as a load for the RF signal, and the resulting load effect may cause energy loss (i.e., signal loss), thereby affecting the performance of the RF amplifier circuit 10. In particular, this load effect is particularly pronounced when the wiring segment 40A is long. In this embodiment, the switching element SW1 may be turned on, such that a resonant structure including the variable capacitive structure 50A and the wiring segment 40A may be formed. For example, by selecting a capacitive element C1 with a suitable capacitance value, the resonant frequency of the resonant structure, formed such as by the inductive element L1, the capacitive element C1, and the wiring segment 40A, may be equal or close to the frequency of the RF input signal RFin. For example, the difference between the resonant frequency and the frequency of the RF input signal RFin may be no more than one tenth of the frequency of the RF input signal RFin. This may reduce the impact of the load effect generated form the long wiring segment 40A and/or the bypass switch SWb1. In this case, to achieve smaller signal loss, a larger-sized transistor may be selected to implement the bypass switch SWb1, thereby better balancing the load effect and energy loss. Conversely, if a smaller-sized transistor is selected to implement the bypass switch SWb1 in the bypass path 30A, a larger energy loss may be caused from the bypass path 30A.

In other embodiments, the load effect of the bypass switch SWb1 can also be reduced by selecting an inductive element L1 with a suitable inductance value. For example, in the case where the inductive element L1 is a metal wiring, the length of the inductive element L1, such as the distance between the node N1 and the capacitive element C1, may be selectively configured.

In the above embodiments, when the RF amplification circuit 10A operates in the second gain mode (e.g., the bypass mode), the bypass switch SWb1 may be turned on. In this case, the switching element SW1 may be turned off, so that the variable capacitive structure 50A may form a high impedance path for the RF input signal RFin, and the RF input signal RFin may be substantially transmitted to the wiring segment 40A, the ON-state bypass switch SWb1, and other components, and further to the output terminal OUT.

In some embodiments of the present invention, the amplification path 20 may further comprise an amplification switch SWm2, a shunt switch SWa1, and a shunt switch SWa2. The amplification switch SWm2 may be coupled between the amplifier 22 and the output terminal OUT, with its first end coupled to the amplifier 22, its second end coupled to the output terminal OUT, and its control end configured to receive a control signal. The amplification switch SWm2 may control the electrical connection between the output terminal OUT and the output end of the amplifier 22 based on the received control signal. A first end of the shunt switch SWa1 may be coupled to the input end of the amplifier 22 (e.g., coupled between the amplification switch SWm1 and the amplifier 22), and a second end of the shunt switch SWa1 may be coupled to a reference voltage terminal REF1. A first end of the shunt switch SWa2 may be coupled to the output end of the amplifier 22 (e.g., coupled between the amplifier 22 and the amplification switch SWm2), and a second end of the shunt switch SWa2 may be coupled to a reference voltage terminal REF2.

In some embodiments of the present invention, the bypass path 30A may further comprise a bypass switch SWb2 and a shunt switch SWc. The bypass switch SWb2 may be coupled between the bypass switch SWb1 and the output terminal OUT, with its first end coupled to the bypass switch SWb1, its second end coupled to the output terminal OUT, and its control end configured to receive a control signal. The bypass switch SWb2 may control the electrical connection between the bypass switch SWb1 and the output terminal OUT based on the received control signal. A first end of the shunt switch SWc may be coupled between the bypass switch SWb1 and the bypass switch SWb2, and a second end of the shunt switch SWc may be coupled to a reference voltage terminal REF3. Specifically, the first end of the shunt switch SWc may be coupled to the first end of the bypass switch SWb2.

In the above embodiments, the reference voltage terminals REF1, REF2, and REF3 may be configured to provide the same or different reference voltages. In specific embodiments, the reference voltage terminals REF1, REF2, and REF3 may be, for example, grounding terminals.

In the above embodiments, when the RF amplification circuit 10A operates in the first gain mode, the amplification switches SWm1 and SWm2 in the amplification path 20 may be turned on, and the bypass switches SWb1 and SWb2 in the bypass path 30A may be turned off. In this case, the shunt switch SWc in the bypass path 30A may be turned on to avoid signal leakage in the bypass path 30A, thereby avoiding or reducing the impact of signal interference. Similarly, when the RF amplification circuit 10A operates in the second gain mode, the amplification switches SWm1 and SWm2 in the amplification path 20 are turned off, and the bypass switches SWb1 and SWb2 in the bypass path 30A may be turned on. In this case, the shunt switches SWa1 and SWa2 in the amplification path 20 may be turned on to avoid signal leakage in the amplification path 20, thereby avoiding or reducing the impact of signal interference.

Figure 2:
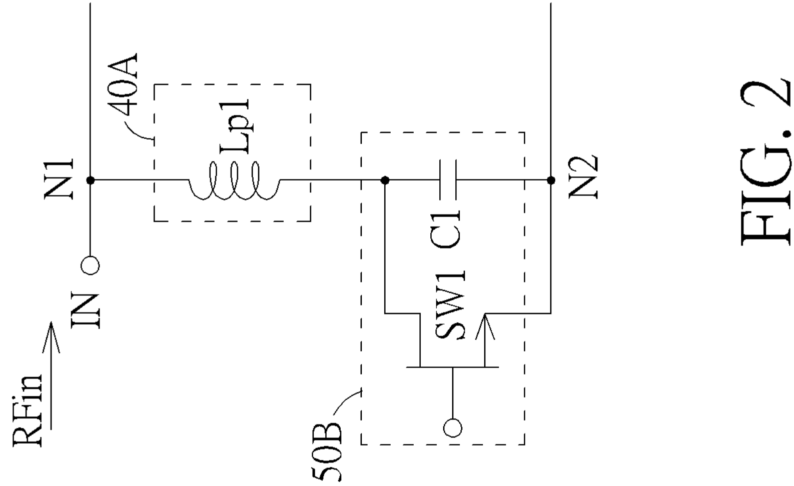
FIG. 2 is a schematic circuit diagram of the wiring segment and the variable capacitive structure in the radio frequency amplification circuit according to an embodiment of the present invention.

In the above embodiments, the variable capacitive structure 50A may be coupled in parallel with the wiring segment 40A between the nodes N1 and N2, and the capacitive element C1 and the switching element SW1 of the variable capacitive structure 50A may be connected in series. However, the invention is not limited thereto. FIG. 2 is a schematic circuit diagram of the wiring segment 40A and a variable capacitive structure 50B in the RF amplification circuit according to another embodiment of the present invention. As shown in FIG. 2, the variable capacitive structure 50B and the wiring segment 40A may be serially coupled between the nodes N1 and N2. The variable capacitive structure 50B may comprise the capacitive element C1 and the switching element SW1, and the capacitive element C1 and the switching element SW1 may be connected in parallel.

In the embodiment, referring to FIGS. 1 and 2, when the RF amplification circuit 10A operates in the first gain mode, the RF input signal RFin may be amplified via the amplification path 20. In this case, the switching element SW1 of the variable capacitive structure 50B may be turned off, so that a resonant structure including the capacitive element C1 (of the variable capacitive structure 50A) and the wiring segment 40A may be formed. For example, by selecting a capacitive element C1 with a suitable capacitance value, the resonant frequency of the resonant structure, formed such as by the capacitive element C1 and the wiring segment 40A, may be equal or close to the frequency of the RF input signal RFin, thereby reducing the impact of the load effect generated from the long wiring segment 40A and/or the off-state bypass switch SWb1. In this case, in order to achieve smaller signal loss, a larger-sized transistor may be selected to implement the bypass switch SWb1, thereby better balancing the load effect and energy loss.

Furthermore, when the RF amplification circuit 10A operates in the second gain mode, the RF input signal RFin may be transmitted via the bypass path 30A. In this case, the bypass switch SWb1 and the switching element SW1 in FIG. 2 may be turned on, so that the RF input signal RFin may be substantially avoided from passing through the capacitive element C1. For example, the RF input signal RFin may be transmitted via the wiring segment 40A, the turned-on bypass switch SWb1, and other components, and further to the output terminal OUT.

Figure 3:
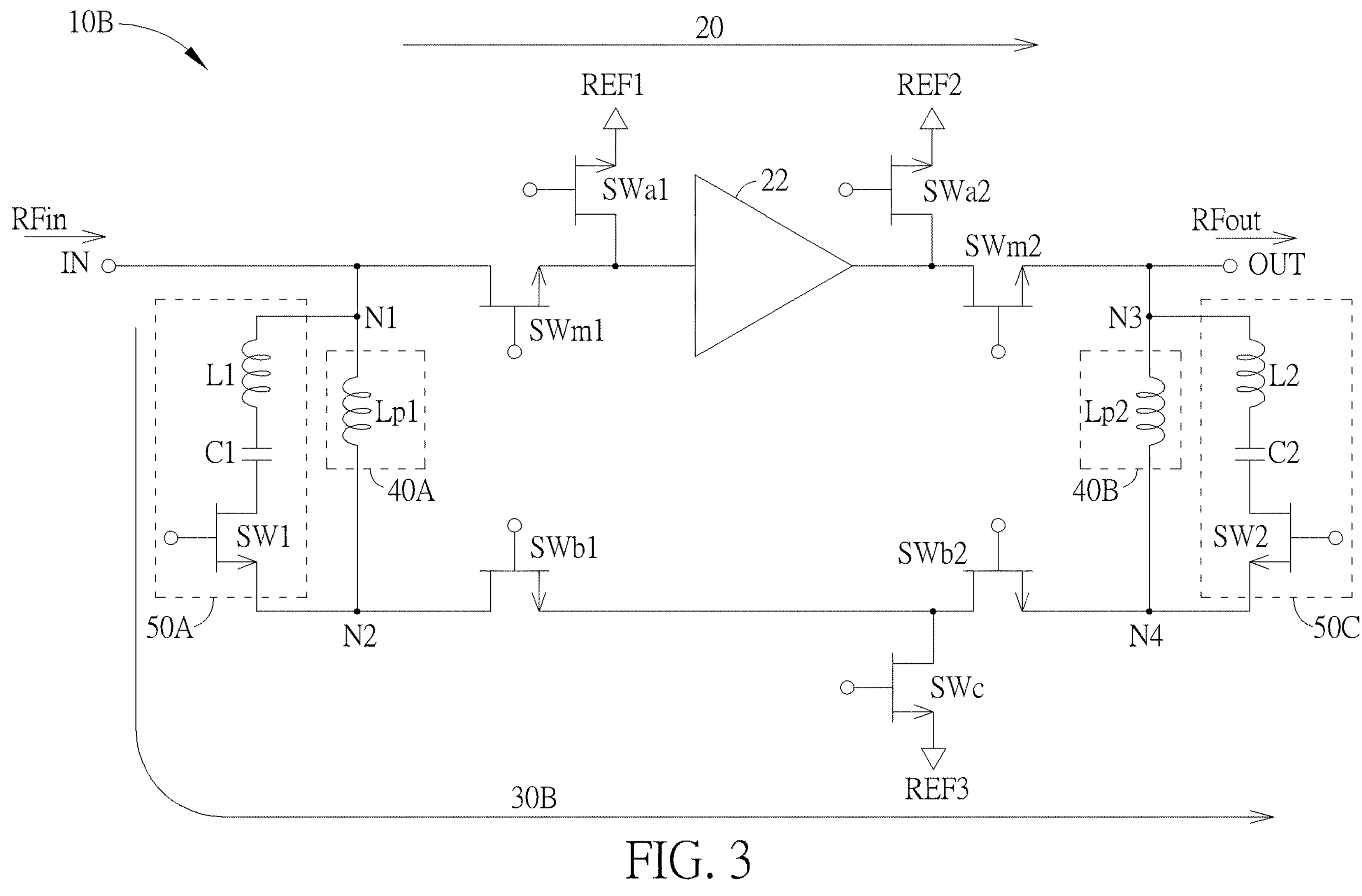
FIG. 3 is a schematic circuit diagram of a radio frequency amplification circuit according to another embodiment of the present invention.

FIG. 3 is a schematic circuit diagram of the RF amplification circuit 10B according to another embodiment of the present invention. As shown in the figure, the RF amplification circuit 10B may be similar to the RF amplification circuit 10A in FIG. 1. For the sake of brevity, only the main differences are discussed here. In the RF amplification circuit 10B shown in FIG. 3, the bypass path 30B may further comprise a node N3, a node N4, a wiring segment 40B, and a variable capacitive structure 50C. The node N3 may be located between the output terminal OUT and the bypass switch SWb2, and the node N4 may be located between node N3 and the bypass switch SWb2. In other words, the node N3 may be located adjacent to the output terminal OUT, and the node N4 may be located adjacent to the bypass switch SWb2. The wiring segment 40B and the variable capacitive structure 50C may be disposed between node N3 and node N4. The variable capacitive structure 50C may comprise a capacitive element C2, a switching element SW2, and an inductive element L2. In the embodiment, the configuration of the variable capacitive structure 50C may be similar to that of the variable capacitive structure 50A, with the difference being that the variable capacitive structure 50C adjacent to the output terminal OUT while the variable capacitive structure 50A adjacent to the input terminal IN.

In this embodiment, when the RF amplification circuit 10B operates in the first gain mode, the RF input signal RFin may be amplified via the amplification path 20. The variable capacitive structure 50A and the wiring segment 40A may be provided to form a resonant structure, while the variable capacitive structure 50C and the wiring segment 40B may be further provided to form another resonant structure. Therefore, the impact of the load effect, such as generated from the long wiring segment 40A and/or the off-state bypass switches SWb1, SWb2, may be further reduced. In this case, in order to achieve smaller signal loss, a larger-sized transistor may be selected to implement the bypass switch SWb2, thereby better balancing the load effect and energy loss. When the RF amplification circuit 10B operates in the second gain mode, the RF input signal RFin may be transmitted via the bypass path 30B. In this case, the bypass switch SWb1 may be turned on, and the switching element SW1 may be turned off, so that the RF input signal RFin may be substantially avoided from passing through the capacitive element C1.

Figure 4:
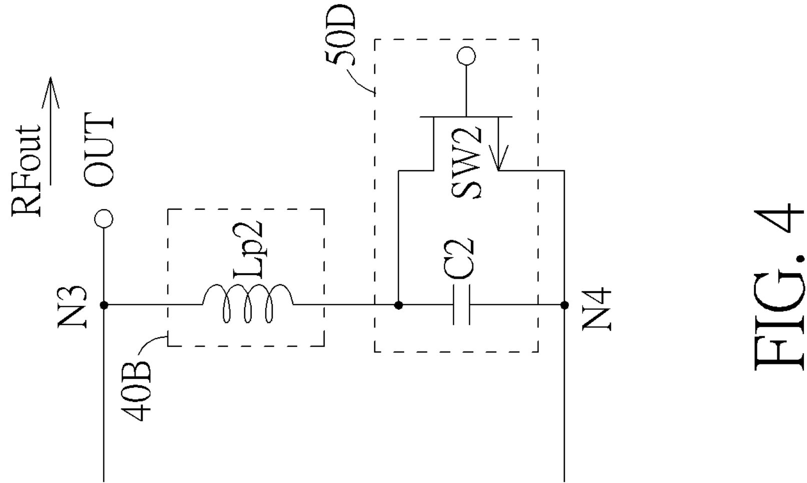
FIG. 4 is a schematic circuit diagram of the wiring segment and the variable capacitive structure in the radio frequency amplification circuit according to another embodiment of the present invention.

FIG. 4 is a schematic circuit diagram of the wiring segment 40B and a variable capacitive structure 50D in the RF amplification circuit according to another embodiment of the present invention. The wiring segment 40B and the variable capacitive structure 50D in FIG. 4 may be configured to replace the wiring segment 40B and the variable capacitive structure 50C in FIG. 3. As shown in FIG. 4, the configuration of the variable capacitive structure 50D and the wiring segment 40B may be similar to the configuration shown in FIG. 2, which may not be described here in detail.

Figure 5:
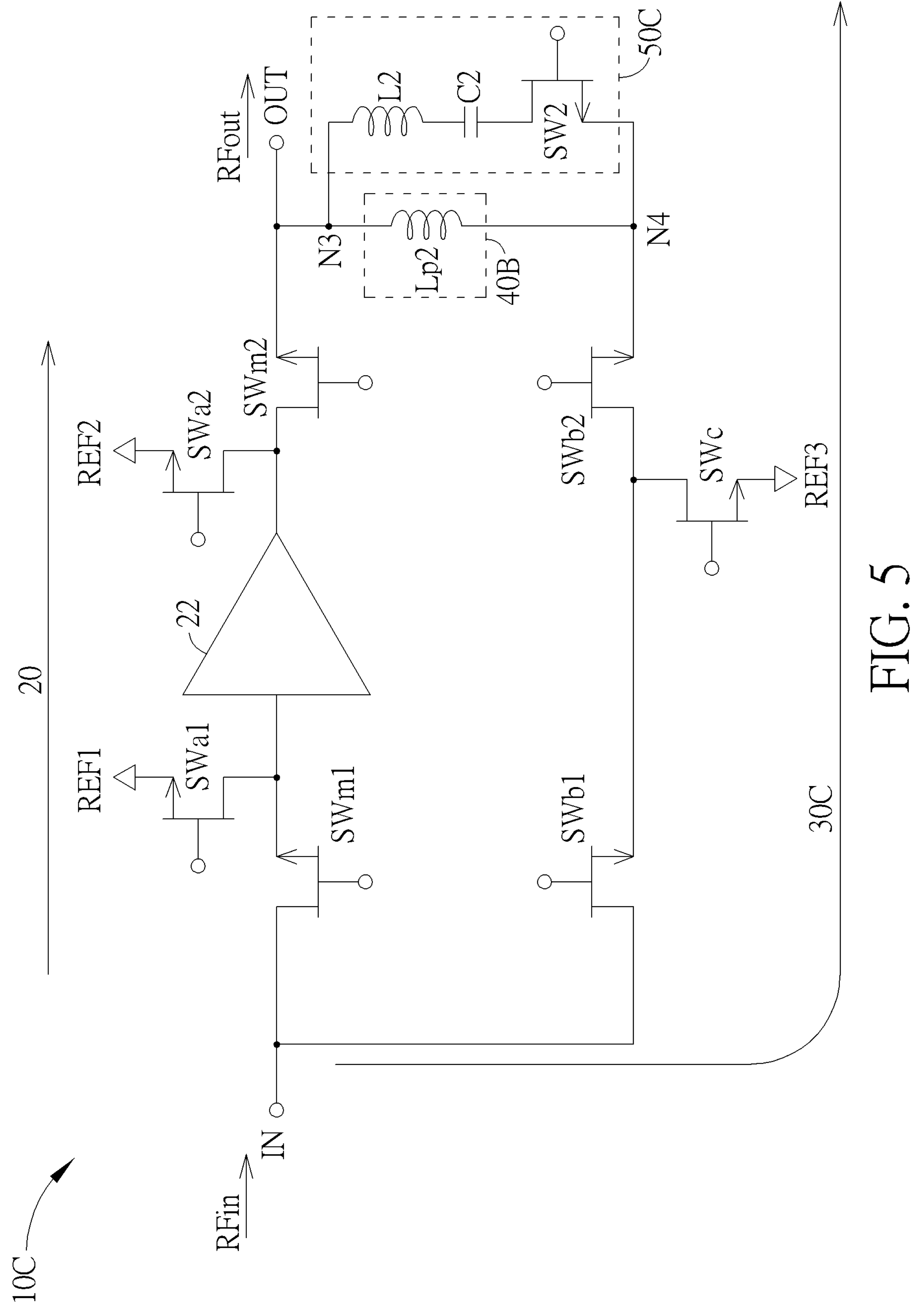
FIG. 5 is a schematic circuit diagram of a radio frequency amplification circuit according to another embodiment of the present invention.

FIG. 5 is a schematic circuit diagram of the RF amplification circuit 10C according to another embodiment of the present invention. As shown, the RF amplification circuit 10C may be similar to the RF amplification circuit 10B in FIG. 3. For the sake of brevity, only the main differences are discussed here. In the RF amplification circuit 10C shown in FIG. 5, the wiring segment 40A and the variable capacitive structure 50A are omitted. In other words, only at the position adjacent to the output terminal OUT, the wiring segment 40B and the variable capacitive structure 50C are provided. The bypass path 30C of the RF amplification circuit 10C may comprise the node N3, the node N4, the wiring segment 40B, and the variable capacitive structure 50C.

Any of the RF amplifier circuits provided in the embodiments of the present invention may be configured to achieve multiple gain modes. A resonant structure may be formed as desired at least by a wiring segment and a variable capacitive structure, and the RF amplification circuit may therefore achieve a smaller load effect and/or less energy loss. Thus, performance of the RF amplifier circuit may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio frequency (RF) amplification circuit, comprising:

an input terminal configured to receive an RF input signal;

an output terminal configured to provide an RF output signal;

an amplification path coupled between the input terminal and the output terminal and comprising an amplifier; and a bypass path coupled in parallel with the amplification path between the input terminal and the output terminal, and comprising:

a first bypass switch;

a first node located between the input terminal and the first bypass switch;

a second node located between the first node and the first bypass switch;

a first wiring segment disposed between the first node and the second node; and a first variable capacitive structure disposed between the first node and the second node and comprising a first capacitive element and a first switching element;

wherein the first variable capacitive structure and the first wiring segment are coupled in parallel between the first node and the second node.

2. The RF amplification circuit of claim 1, wherein, as for the first variable capacitive structure, the first capacitive element is coupled in series with the first switching element.

3. The RF amplification circuit of claim 1, wherein:

when the first bypass switch is turned off, the first switching element is turned on; or when the first bypass switch is turned on, the first switching element is turned off.

4. A radio frequency (RF) amplification circuit, comprising:

an input terminal configured to receive an RF input signal;

an output terminal configured to provide an RF output signal;

an amplification path coupled between the input terminal and the output terminal and comprising an amplifier; and a bypass path coupled in parallel with the amplification path between the input terminal and the output terminal, and comprising:

a first bypass switch;

a first node located between the input terminal and the first bypass switch;

a second node located between the first node and the first bypass switch;

a first wiring segment disposed between the first node and the second node; and a first variable capacitive structure disposed between the first node and the second node and comprising a first capacitive element and a first switching element;

wherein the first variable capacitive structure and the first wiring segment are coupled in series between the first node and the second node.

5. The RF amplification circuit of claim 4, wherein, as for the first variable capacitive structure, the first capacitive element and the first switching element are coupled in parallel.

6. The RF amplification circuit of claim 4, wherein:

when the first bypass switch is turned off, the first switching element is turned off; or when the first bypass switch is turned on, the first switching element is turned on.

7. The RF amplification circuit of claim 1, wherein the bypass path further comprises:

a second bypass switch coupled between the first bypass switch and the output terminal;

a third node located between the output terminal and the second bypass switch;

a fourth node located between the third node and the second bypass switch;

a second wiring segment disposed between the third node and the fourth node; and a second variable capacitive structure disposed between the third node and the fourth node and comprising a second capacitive element and a second switching element.

8. The RF amplification circuit of claim 7, wherein the second variable capacitive structure and the second wiring segment are coupled in parallel between the third node and the fourth node.

9. The RF amplification circuit of claim 8, wherein the second capacitive element and the second switching element are coupled in series.

10. The RF amplification circuit of claim 7, wherein the second variable capacitive structure and the second wiring segment are coupled in series between the third node and the fourth node.

11. The RF amplification circuit of claim 10, wherein the second capacitive element is coupled in parallel with the second switching element.

12. The RF amplification circuit of claim 1, wherein the amplification path further comprises:

a first amplification switch, coupled between the input terminal and the amplifier and configured to control electrical connection between the input terminal and the amplifier; and a second amplification switch, coupled between the amplifier and the output terminal and configured to control electrical connection between the output terminal and the amplifier.

13. The RF amplification circuit of claim 12, wherein the amplification path further comprises:

a first shunt switch comprising a first end coupled between the first amplification switch and the amplifier, and a second end coupled to a first reference voltage terminal; and a second shunt switch comprising a first end coupled between the amplifier and the second amplification switch, and a second end coupled to a second reference voltage terminal;

wherein when the first amplification switch and/or the second amplification switch is turned off, the first shunt switch and the second shunt switch are turned on.

14. The RF amplification circuit of claim 1, wherein the bypass path further comprises:

a second bypass switch disposed between the first bypass switch and the output terminal; and a third shunt switch comprising a first end coupled between the first bypass switch and the second bypass switch, and a second end coupled to a third reference voltage terminal;

wherein when the first bypass switch and/or the second bypass switch is turned off, the third shunt switch is turned on.

15. The RF amplification circuit of claim 1, wherein the first wiring segment has a first parasitic inductance.

16. The RF amplification circuit of claim 1, wherein the first variable capacitive structure further comprises a first inductive element.

17. The RF amplification circuit of claim 1, wherein the amplifier of the amplification path is disposed on a first chip, the first bypass switch of the bypass path is disposed on the first chip, and the first wiring segment is disposed on a first carrier board.

18. The RF amplification circuit of claim 1, wherein the amplifier of the amplification path is disposed on a first chip, the first bypass switch of the bypass path is disposed on a second chip, and the first wiring segment is disposed on a first carrier board.

19. A radio frequency (RF) amplification circuit, comprising:

an input terminal configured to receive an RF input signal;

an output terminal configured to provide an RF output signal;

an amplification path coupled between the input terminal and the output terminal and comprising an amplifier; and a bypass path coupled in parallel with the amplification path between the input terminal and the output terminal, and comprising:

a bypass switch;

a first node located between the output terminal and the bypass switch;

a second node located between the first node and the bypass switch;

a wiring segment disposed between the first node and the second node; and a variable capacitive structure disposed between the first node and the second node and comprising a capacitive element and a switching element.

* * * * *